SR
XR 3,721,756
SEARCH ROOM

INFORMATION DISPLAY METHOD AND SYSTEM

Original Filed Oct. 17, 1966 4 Sheets-Sheet 1

3721756
OR IN 358/63

INFORMATION DISPLAY METHOD AND SYSTEM

INFORMATION DISPLAY METHOD AND SYSTEM

Original Filed Oct. 17, 1966 4 Sheets-Sheet 4

United States Patent Office 3,721,756
Patented Mar. 20, 1973

3,721,756
INFORMATION DISPLAY METHOD AND SYSTEM

Charles E. Baker, Dallas, Tex., assignor to Texas Instruments Incorporated, Dallas, Tex.

Continuation of application Ser. No. 587,095, Oct. 17, 1966. This application Apr. 20, 1970, Ser. No. 29,941
Int. Cl. H04a 1/04
U.S. Cl. 178—6 13 Claims

ABSTRACT OF THE DISCLOSURE

A large screen real time laser display system is described. A magnetic drum and a multi-faceted scanning mirror are mounted on a common shaft and rotated at a high rate of speed. Digital data descriptive of the image to be displayed is stored on a plurality of tracks on the drum and updated as required by a digital computer. The data is continually read from the drum and red, blue and green laser beams are split into a plurality of beams each of which is modulated in accordance with the stored information. The modulated beams are then recombined and directed onto the multi-faceted mirror which scans the beams over a screen to produce a full color image. The light modulators are acoustic modulator bodies in which stress waves having a plurality of separate wavelengths, each individually amplitude modulated, are established. This produces a plurality of individually amplitude modulated light beams.

This application is a continuation application of patent application Ser. No. 587,095 filed Oct. 17, 1966, now abandoned, and assigned to the same assignee as this patent application.

This invention relates to a display system capable of large screen, real time projection and, more particularly, to the storage of information on a rotating system synchronized with a rotating light reflection system with modulation of light being dependent upon the stored information.

Large screen displays of alpha-numeric information have heretofore been carried out by selectively energizing a matrix of lamps or by selectively controlling the positions of movable elements of contrasting reflectivity where the elements are mounted in a planar matrix. Further, a television type raster scan laser display has previously been provided wherein fiber optics are employed.

Small screen cathode ray tube type digital data displays heretofore have solved the image storage problem either of two ways: (1) they store the *x, y* coordinates of each display point in a magnetic core "refresh" memory which is cycled fast enough to prevent flicker, or (2) they use an image storage tube. The magnetic core storage technique has limited the maximum display image complexity to a few thousand points. The storage tube approach has resulted in frequent erasures and loss of data or bluring of dynamic data.

The present invention is directed to an improved and yet simplified system which is capable of the display of alpha-numeric information as well as more generalized information.

In accordance with one aspect of the present invention in which a display comparable to that of a television presentation is produced, all of the points of an image are reproduced at a high repetition rate, of the order of 60 times a second, to generate a flicker-free image display. The image may be computer generated or otherwise digitally stored.

Simplified image storage and synchronized beam deflection are provided by a rotating magnetic memory element preferably attached to a multi-facet scanning mirror. Every image point is stored digitally in the magnetic drum refresh memory eliminating restrictions on image complexity or format. The display image may also be interrogated by a computer for updating purposes so that it is not necessary for a computer to "remember" what is being displayed.

More particularly, a system for producing a display on a screen is provided wherein a storage drum is employed for storage of information to be displayed. A multi-faceted mirror is mounted for rotation in predetermined relation with respect to said drum, preferably mechanically locked to the drum. A plurality of sources produce light beams which are incident on said mirror in a selected pattern and are reflected to sweep the screen. Modulators individually modulate the beams in accordance with information signals from the drum. Preferably a plurality of laser sources of different color contribute to each beam.

A relatively low bit rate from the drum is matched to the bit rate required to continuously refresh the multipoint multi-color display by reading from magnetic drum tracks in parallel. The output from each track controls the intensity of an associated light beam. A multi-beam light modulator modulates light beams from one or more laser beams with one modulator being required for each primary color.

For a more complete understanding of the present invention and for further objects and advantages thereof, reference may now be had to the following description taken in conjunction with the accompanying drawings in which.

Figure 1:
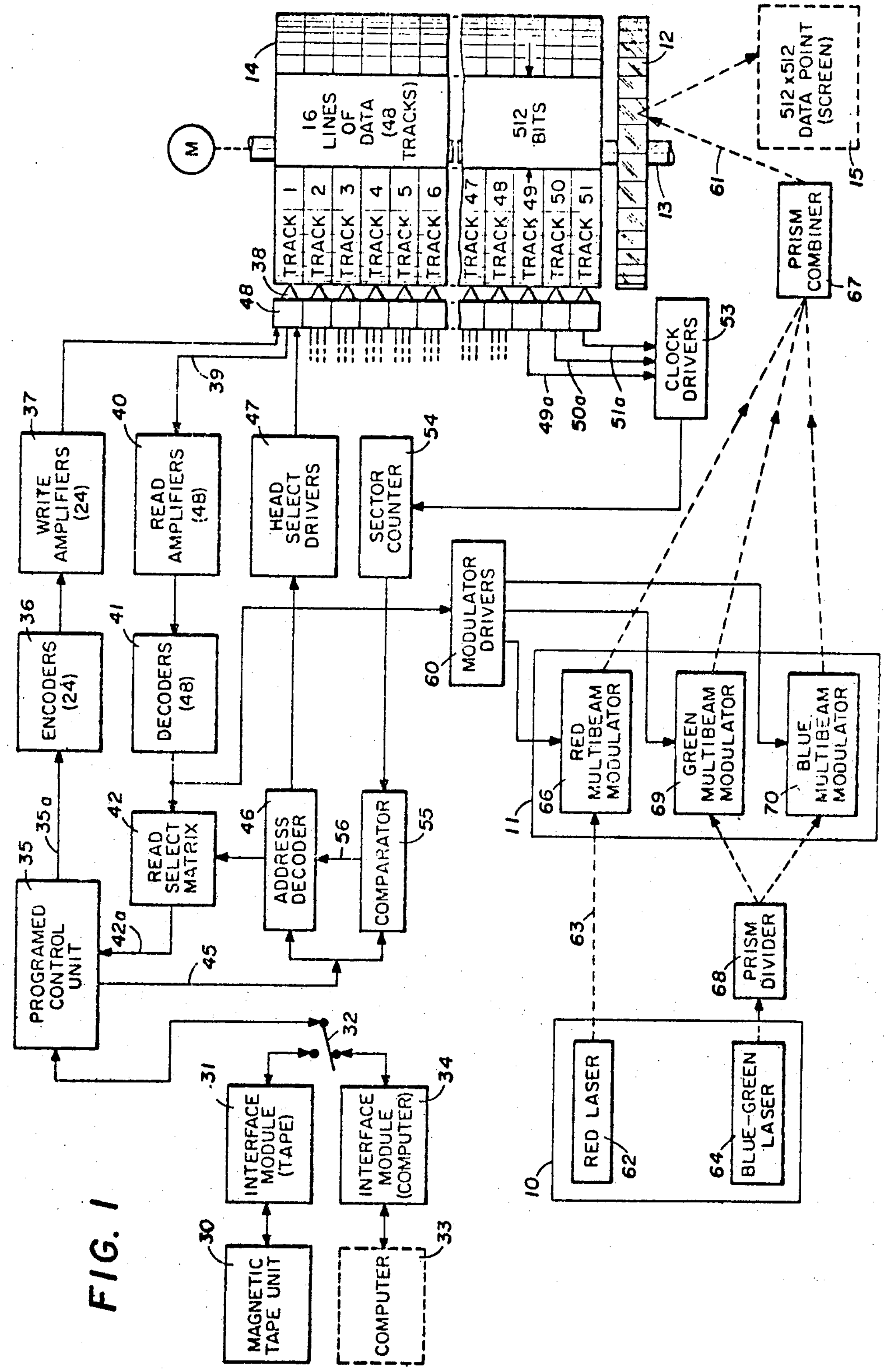
FIG. 1 is a diagram prepared in block form illustrating one embodiment of the present invention.
Figures 4A, 4B, 5:
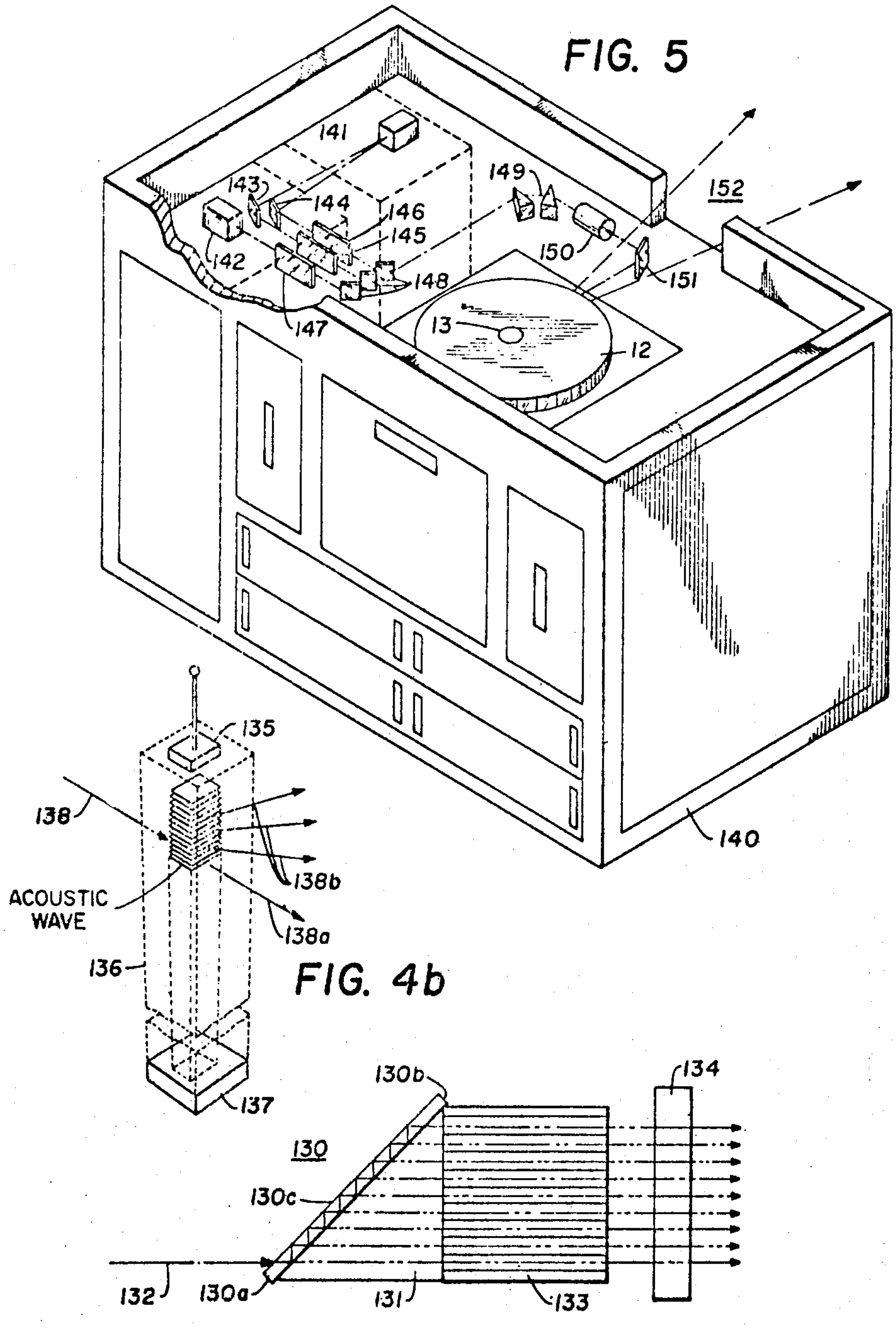

FIG. 4*a* illustrates a modified form of modulator;

FIG. 4*b* illustrates another modulator that may be found to be suitable;

FIG. 5 illustrates an installation involving the invention of FIG. 1; and

Figure 6:
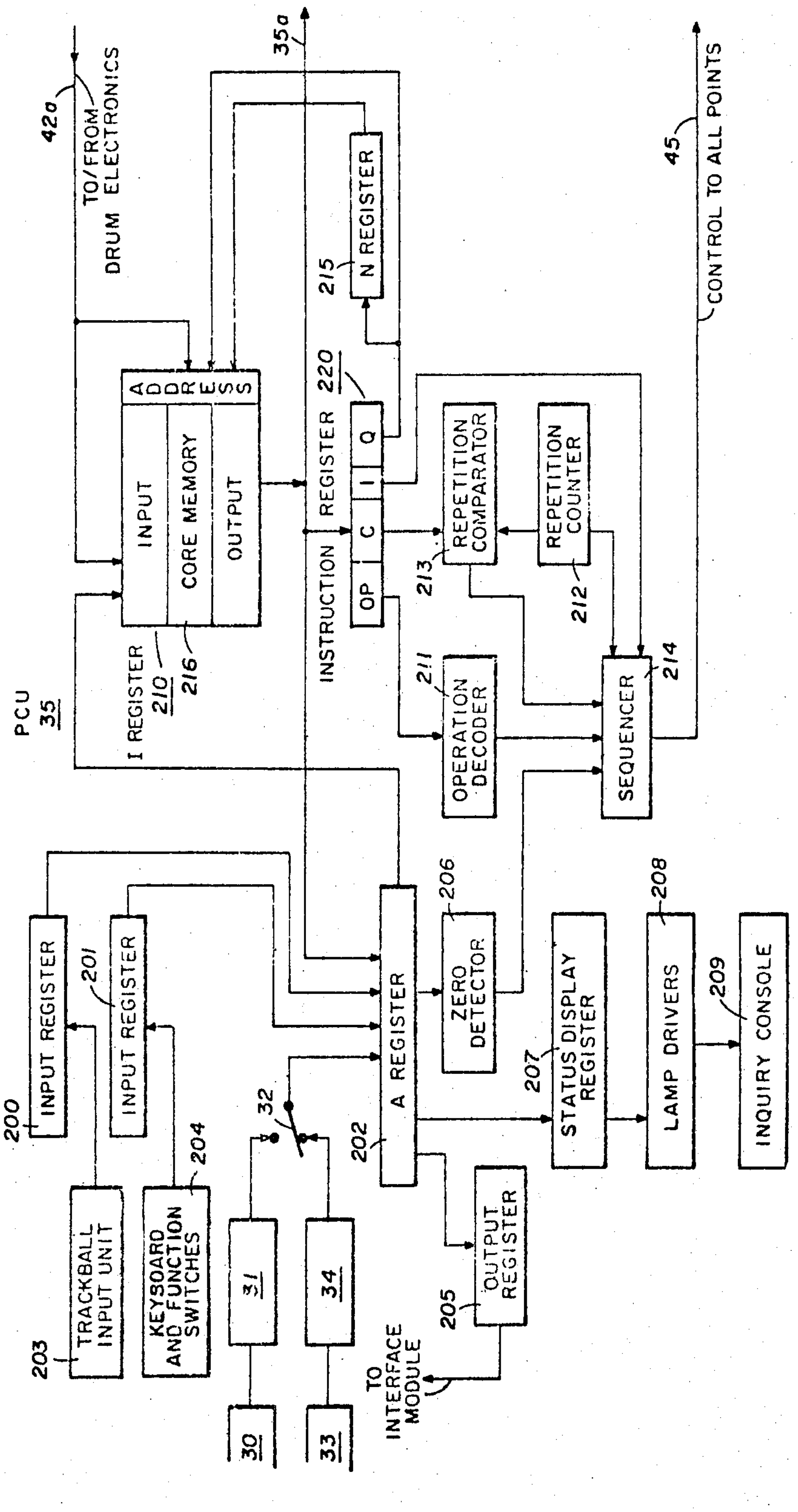

FIG. 6 illustrates the PCU unit 35 of FIG. 1.

Referring now to FIG. 1, this embodiment of the display system utilizes light beams from a laser source unit 10. The light beams are modulated in a modulator bank 11 and are reflected from a multi-faceted mirror 12.

Preferably, the mirror 12 will be mounted on a shaft 13 which is common to a multi-track memory drum 14. Information stored on drum 14 is employed for control of the modulators in bank 11 so that the display on screen 15 will be responsive to and representative of the information stored on drum 14.

The mirror 12 in practice will have a diameter of the order of the diameter of the drum 14. Each beam then scans the viewing screen 15 by action of the multi-faceted scanning mirror 12. In the embodiment shown in FIG. 1, the mirror 12 has 32 facets uniformly disposed around the periphery thereof. Each facet of the mirror 12 performs a horizontal scan of the screen 15 as it rotates with the drum 14. Vertical scanning is accomplished by mounting each facet tilted at a slightly different angle with respect to the axis of rotation.

While only one light beam is indicated in FIG. 1, a greater number, of the order of sixteen for example, will be employed with the 32-facet scanning mirror. In such case, the modulated beams give a vertical resolution of 512 lines which may be identical with the horizontal resolution. The use of multiple scanned beams of light allows beam deflection to be performed by a relatively simple low speed device such as the mirror 12. This also greatly reduces the band width of information which must be handled by a single light beam.

Each light beam impinging the mirror 12 may comprise a composite of different colors from three different color sources for producing a full color display. In a simple alpha-numeric display, a single source would be required for each beam and only 7 beams and beam modulators would be required in parallel operation to portray alpha-numeric information. In the description which follows it is to be understood that a 512 by 512 data point display will be provided on screen 15 and that it will be produced in full color through the use of sixteen three component beams operated in parallel. This requires forty-eight data tracks on drum 14 and a like number of modulators.

In FIG. 1 the information to be displayed may be applied to the system from a tape input unit 30 by way of an interface module 31 and a channel selector 32. Alternatively, information to be displayed may be generated by a computer 33 which is coupled to selector 32 by way of an interface unit 34. The information is then fed to a programmed control unit (PCU) 35. Data from the PCU 35 is applied by way of encoders 36 and amplifiers 37 to read-write head 38 on drum 14. Read channels 39 lead from head 38 to read amplifiers 40 which drive decoders 41. A read select matrix 42 couples the decoder 41 back to the PCU 35.

Drum address channels 45 lead from PCU 35 to address decoder 46. Decoder 46 activates the head selector drivers 47 which are coupled to the input unit 48 of drum 14.

Channels 49*a*, 50*a* and 51*a* lead from timing tracks 49, 50 and 51 on drum 14 to clock drivers 53. Drivers 53 energize sector control 54 and thus control comparator 55. Comparator 55 is coupled by channels 56 to the address decoders 46. Decoders 46 are coupled by channels 57 to the read select matrix 42.

Information derived from drum 14 is applied from the output of the decoders 41 to modulator drivers 60 to control the intensities of the several light beams.

The generation and control of the production of one light beam 61 has been illustrated in FIG. 1. A laser 62 such as the 6328 angstrom neon-helium gas laser having a red output beam 63 is employed in conjunction with a second laser 64 such as the 4880–5145 angstrom argon ion laser which has blue and green output beams 65. The red beam 63 is transmitted by way of a modulator 66 to a beam combiner 67. A beam divider 68 separates the green and blue beams from laser 64 and applies them to a green beam modulator 69 and a blue beam modulator 70, respectively. The green beam and the blue beam are then combined with the red beam in the beam combiner 67 to form the multicolor beam 61.

The modulators 66, 69 and 70 are controlled by the modulator drivers 60. The beam modulation of each of the three primary colors is thus independently controlled in dependence upon signal information stored on drum 14.

Figures 2, 3:
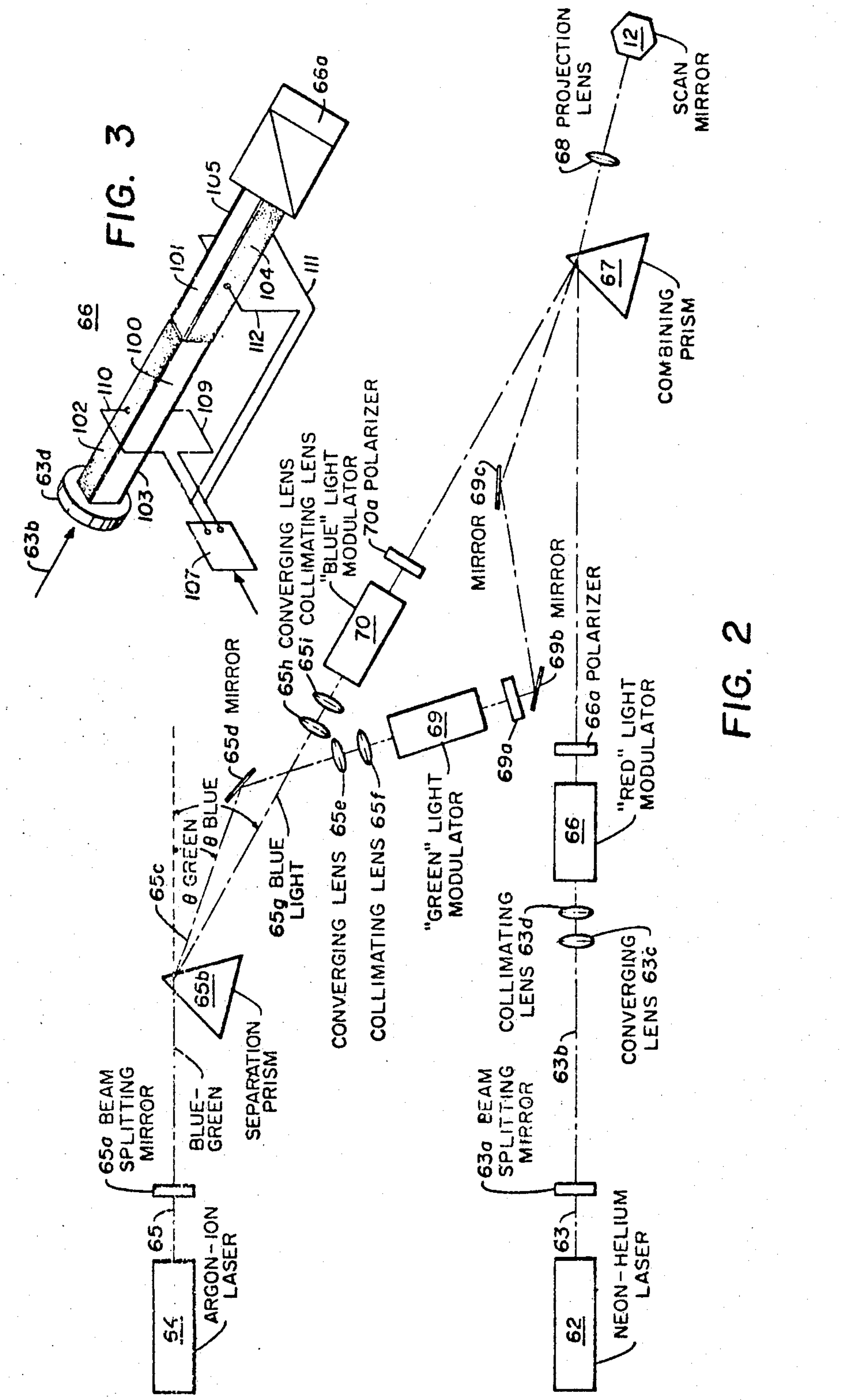
FIG. 2 is a diagram of an optical system for one embodiment of the invention.
FIG. 3 is an isometric view of one form of light modulator.

A suitable optical system for producing and modulating one beam is illustrated diagrammatically in FIG. 2. Laser 62 is a neon-helium laser having an output beam 63 which passes through a beam splitter 63*a* so that one laser may be employed effectively to generate more than one beam. Part 63*b* of the beam 63 passes through a converging lens 63*c* and a collimating lens 63*d* to the red modulator 66. The modulated output beam passes through a polarizer 66*a* and thence to a combining prism 67. The beam from the prism 67 passes through a projection lens 68 to the scan mirror 12.

The laser 64 is an argon-ion laser having blue and green beams 65 which pass through a beam splitting mirror 65*a*. A portion of the light from the mirror 65*a* passes through a separation prism 65*b*. The green beam 65*c* from prism 65*b* is reflected from a mirror 65*d* through a converging lens 65*e* and a collimating lens 65*f* from which it passes to the green light modulator 69. The output beam from modulator 69 passes through a polarizer 69*a* and is reflected from mirrors 69*b* and 69*c* to the adding prism 67.

The blue light beam 65*g* passes through converging lens 65*h* and collimating lens 65*i* to the blue modulator 70. The output beam from modulator 70 passes through a polarizer 70*a* to the adding prism 67.

Beam modulator 66, in one form, is shown in FIG. 3. It comprises a transverse field, Pockel's-effect unit constructed from a 45-degree Z-cut crystal of potassium dihydrogen phosphate (KDP). With such a 45-degree Z-cut orientation a transverse electric field is applied perpendicular to the direction of light propagation utilizing the 63 electro-optic coefficient of KDP for amplitude modulation.

Modulator 66 is formed of two crystals 100 and 101 of KDP. The crystals 100 and 101 are identical in orientation. They are positioned between the collimating lens 63*d* and the polarizer 66*a*. Crystal 100 is provided with electrodes 102 and 103. Crystal 101 is provided with electrodes 104 and 105. The crystals 100 and 101 are arranged in tandem with their optical axes orthogonal.

Their optical axes are normal to the respective electrode crystal faces. Preferably, index matching oil junctions are used between the crystals 100 and 101, lens 63*d* and polarizer 66*a*.

Driver amplifier 107, included in the modulator driver 60 of FIG. 1, is coupled by way of conductor 109 to electrode 101 and by way of conductor 110 to electrode 102. Driver 107 is also connected by way of conductor 111 to electrode 104 and by way of conductor 112 to electrode 106. By this means, the modulator may be controlled in dependence upon information stored on drum 14. Modulator 66 is a polarization modulator with linearly polarized light from laser 62 passing down the longitudinal axes of the crystals 100 and 101. Under the influence of the variable electric field applied along the optical axes of the crystals 100 and 101, a variable amount of elliptical polarization is produced in the emerging light beam. The polarizer 66*a* oriented perpendicular to the polarization of the incident beam 63*b* converts the varying elliptically polarized light into linearly polarized amplitude modulated light. By selecting the initial bias voltage on the modulator, almost no light will be allowed to pass. As is understood in the art, the bias voltage is determined by the polarizer quality, by the degree of light beam collimation and by the electro-optic crystal alignment. An applied signal can allow from 0 to nearly 100 percent of the incident light to pass. As further understood the voltage required to vary the modulator output from a minimum to a maximum is commonly referred to as the half-wave retardation voltage. This corresponds to the voltage required to change the relative phase shift between the orthogonal polarized components into which the incident light is decomposed upon entering the crystal by one-half wavelength.

FIG. 4*a* illustrates one form of a multi-beam light modulator. The modulator includes a beam splitter 130 which is a plate of plane, parallel-polished fused silica. The plate 130 is cemented to a prism 131. The surface between plate 130 and prism 131 is coated with a low-loss multilayer dielectric coating whose transmission is graded from 6% at the lower end 130*a* to 50% at the upper end 130*b*. The incident beam 132 enters the plate 130 at the lower end. The plurality of beams are incident on the face of plate 130 opposite the coating at an angle greater than the critical angle and thus they undergo total internal reflection. Because of the gradation in coating, beams of equal intensity pass through prism 131 with uniform spacing.

A single electro-optic crystal 133 is positioned to receive the light beams from the prism 131. Spaced electrodes on opposite sides of the crystal 133 are then employed to vary the electrical polarization of the light passing therethrough. Thus the beams emerging from an analyzer 134 may be of intensity dependent upon the modulator voltages applied to the crystal 133. The prism 131 serves to eliminate glass-to-air reflection losses and protects the dielectric coating on the plate 130. Multilayer coatings of the type above described are well known and routinely prepared by manufacturing companies.

It should be appreciated that other types of beam splitters and modulators may be employed.

An alternate means modulating an array of light beams involves the use of an ultrasonic light modulator of the type shown in FIG. 4*b*. This device consists of a piezoelectric transducer 135, which generates a traveling ultrasonic stress wave under the control of an applied electrical signal. This stress wave changes the index of refraction, through the stress-optic effect, of a light modulating medium such as water or fused silica body 136 mounted with one end in contact with an absorber 137. The resulting effect is, for a sinusoidal drive signal, similar to that produced by a ruled diffraction grating. Light will be diffracted from an incident light beam 138 at an angle determined by the light modulation drive frequency. Diffracted beam **138*b* and undiffracted beam 138*a* will thus be controlled by the acoustic waves through element 136. Diffracted light intensity is determined by drive level. Sixteen modulated light beams such as beam 138** may thus be produced by driving the ultrasonic light modulator with 16 different carrier frequencies each of whose amplitude is controlled to be proportional to the desired beam intensity. Typically 16 carrier frequencies might be equally disposed between 50 and 82 megacycles each modulated at a maximum rate of 1 megacycle.

In FIG. 5 an installation involving the present invention is illustrated wherein the mirror 12 is mounted on the storage drum shaft 13 of which are mounted in a cabinet 140.

The optics of the system are indicated generally as including a direction 141 for the blue and green beams and director 142 for the red beam. The blue and green beams are reflected by mirrors 143 and 144 as to pass through modulators 145 and 146 with the red beam passing through the modulator 147. Mirrors 148 direct the beams through prisms 149 and lens 150 to a mirror 151. Light is reflected from the mirror 151 onto the mirror 12 which causes the beam to sweep through the aperture defined by an opening 152 in housing 140.

The PCU 35 preferably is a high-speed logical unit operating on and from information contained in its core memory. With proper programming, the PCU 35 is capable of (1) handling the transfer and routing of information between a keyboard, control switches, input/output registers, and the display drum, (2) performing locally such tasks as character and vector generation, (3) examining and logically modifying data or control action, (4) reconstituting compressed data, and (5) performing the general "housekeeping" duties for the display system. All directions for operations may be stored in the memory. The PCU 35 can perform any task that can be logically described to it within the limitation of time and memory capacity. All programs need not be stored in the PCU 35 at one time. New programs can be read from storage as they are needed.

In FIG. 6, the PCU 35 has been shown in its relationship to the input units 30 and 33 and to the line **35*a* leading to encoder, line 42*a* leading to the read select matrix 42 and line 45 leading to both the address decoder 46 and the comparator 55**.

The PCU has a first input register 200 through which input information may be supplied from a trackball input unit 203. The trackball unit 203 may convert coordinate information into a form which may be employed in the PCU 35.

The trackball is a manual input device. To the operator, it appears at the top of a small ball protruding through the top of the panel. The ball may be rolled by finger pressure in any direction proportionally controlling the position of a "locator symbol" on the screen. This input combines sensitivity with actions that are natural to an operator.

The locator symbol, which is controlled by the trackball, is provided to indicate a particular point of interest on the display screen and also to have the address of this point available for computational purposes.

A suitable locator symbol circuit operates from the trackball and when activated sends its signals directly to the modulator drivers so that no PCU time is wasted in positioning the locator. When required, the PCU can read the trackball address and thus indicate precisely where the locator symbol is positioned on the screen.

A second input register is employed in connection with a keyboard and function switch unit 204. The switch 32 and registers 200 and 201 are connected to an A register 202. The A register 202 is connected to an output register 205 which leads to the interface modules 31 and 34. The A register also has an output leading to a zero decoder 206 and a further output channel leading to a status display register 207 which actuates lamp drivers 208 on an inquiry console 209.

A fourth output from the A register extends to the input section of a memory indicated generally by the reference numeral. The memory 210 has an input section, a core memory section 216, an output section and an address unit. The output section of memory 210 is coupled to the A register 202 and to the channel **35*a* and to an instruction register 220. Instruction register 220** has (i) an operation code (OP) section, (ii) a repetition counter (*c*) section which indicates how many times a green command is to be repeated, (iii) an indirect address bit (I) register, and (iv) an address (Q) register for the addresses of the commands.

An operation decoder 211 is connected between instruction register 220 and sequencer 214. A repetition comparator 213 is connected between instruction register 220 and sequencer 214 with a repetition counter 212 being connected between sequencer 214 and comparator 213. The sequencer 214 feeds the output control line 45. An N register is connected to unit 220. The address section of memory 210 is connected both to the register 215 and to the instruction register 220. The line **42*a* is connected both to the address section of memory 210** and to its input section.

Thus, FIG. 6, shows the internal configuration and data flow of the PCU 35. It will be seen that there are three input registers 200, 201 and 202. Registers 200 and 201 are standard registers which read information from the input units 203 and 204. The output register 205 sends 24 bits to the interface unit leading to the computer 33. All input/output transfer and arithmetic logical operation take place in the A register 202.

The PCU 35 may also load information into a status display register 207. The logical condition of the bit positions in this register is indicated by lights on the inquiry console 209. This permits the program in the PCU 35 to communicate with the console operator without disrupting the displayed image. Status lamps on console 209 may light permanently marked indicators indicating conditions such as "Display Ready," "Keyboard Ready" and "Operator Intervention Required." Other positions light lamps over the function keys and indicate which of the functions are available at a given point in a program.

The instruction the PCU 35 will perform is determined by the contents clocked from the memory into the instruction register 220. The first six bits of the command word form an operational code which is decoded by the operation decoder 211. The next five bits form the repetition count. If these bits are not already zero, the order will be repeated, toggling repetition counter 212 for each repetition until coincidence is detected by the repetition comparator 213. The last 12 bits form the address portion of the command. The 13th bit is the indirect address bit. If this bit is non-zero when a command is clocked into the instruction register, the memory cycle will be repeated, although only the last 13 bits of the new work will be loaded into the instruction register. If the 13th bit is still non-zero, this cycle will repeat until a non-direct address is found.

All control signals go to a sequencer block 214 which furnishes timing and operational signals to all units. The N register 215 holds the address of the next command to be clocked into the instruction register. On normal commands it acts as a counter and is toggled by one. On branch commands it is reset from the address portion of the instruction register.

The contents of the A, I and N registers may be displayed with lamps on the front panel of the PCU 35 for troubleshooting and diagnostic purposes. The regular clock may be switched off from counter 54, FIG. 1, and the program may be stepped by a manual pushbutton. A series of switches (not shown) may permit insertion of data directly into the A, I and N registers.

The PCU memory 210 may be of the type commercially available. Preferably it will be a 4096-word by 24-bit core storage unit with a 2-microsecond full-cycle time and a 1-microsecond half-cycle time. The memory preferably will contain data protect features which prevent data in the cores from being destroyed by power failures or normal turn-off. During the execution of core-to-drum and drum-to core transfers, the memory operates under the control of the memory drum unit. In this mode the memory uses the half-cycle mode.

The clock rate for the PCU is 1.06 megacycle derived from the drum bit clock.

Thus there is provided a large-screen, real-time, projection display system which may be employed for on-line operation with a digital computer. In a preferred embodiment, the display is generated by modulating and deflecting coherent light from a red and a blue-green laser to produce by a 512- by 512-point, multicolor display.

All 262,144 points of an image are digitally stored and reproduced 60 times a second to generate a flicker-free display image. The scanning used ensures linearity and color registration. The resolution can readily be increased to 1024 by 1024 points if a particular application warrants. The update rate is limited only by the information transfer rate of the associated computer and can exceed one million bits per second.

A computer, such as the IBM 360, is rendered compatible through programmed control unit PCU 35 which connects to the computer input/output channel in the same manner as other input/output equipments. The control unit performs character generation, vector generation, formatting, buffering, and other display-computer intercommunication functions.

A 1-watt, RF-pumped, ring-discharge argon laser may be used as the blue and green light source. The wavelengths of the 400-milliwatt blue line and the 250-milliwatt green line in the argon laser are 4880 angstroms and 5145 angstroms, respectively. An RF-pumped krypton ion laser optimized for 6470 angstrom operation may be used as the red source. A 1-watt krypton laser may produce 330 milliwatts at 6470 angstroms. Alternatively, four Spectra-Physics Model 125, 6328-angstrom neon-helium lasers may be used for the red primary source. Their combined output power is in excess of 300 milliwatts. The greater optical complexity inherent in this arrangement would be partially compensated by the higher visibility factor of the 6328-angstrom line and the proven reliability of the neon-helium laser.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method for displaying information as a visible image which comprises:

rotating a digital memory element having digital information stored thereon defining the visible image and a multi-faceted mirror fixed on a common shaft, directing at least one light beam onto the rotating mirror such that the light beam is scanned over a display surface in a predetermined manner, continuously retrieving the information from the memory element and modulating said light beam in accordance with the information retrieved from the memory element to produce the visible image on the display surface, and changing the visible image by updating the digital information stored on the memory element.

2. The method of claim 1 wherein a plurality of light beams are directed onto the rotating mirror, and the light beams are simultaneously modulated in accordance with information simultaneously retrieved from a corresponding number of data channels on the memory element.

3. The method of claim 1 wherein at least two color components of a beam are separately modulated by color dependent information signals stored on different information channels of the memory element.

4. The method of claim 1 wherein the visible image is changed by retrieving a portion of the digital information from the memory element, updating the retrieved information, and storing the updated information back on the memory element.

5. A system for producing an information display on a surface which comprises:

a rotating storage element for storing digital data defining the information to be displayed, a multi-faceted mirror rigidly connected to the storage element for rotation therewith, mean for producing a plurality of individually modulated light beams which are incident upon the facets of the mirror as it is rotated and are reflected to sweep different paths on the surface, means for retrieving the data from the storage element and modulating each light beam in accordance with the retrieved data to produce an image on the surface visually displaying the information, and digital processing means for retrieving the digital data stored on the storage element, updating the retrieved digital data and storing the updated digital data on the storage element to change the information displayed.

6. The system set forth in claim 5 wherein the means for producing a plurality of individually modulated light beams comprises at least one laser and at least one acoustic light modulator.

7. The system set forth in claim 6 wherein said at least one acoustic modulator comprises a light modulating medium, means for inducing ultrasonic stress waves in the medium in response to an electrical signal, and means for modulating the electrical signal to provide a plurality of frequencies, the amplitude of each frequency being individually modulated in accordance wtih different data reproduced from the storage means.

8. The system set forth in claim 7 wherein successive facets on said mirror are tilted at different angles relative to the axis of rotation to cause the same set of beams of light to sweep said surface along spaced paths determined by said angles.

9. The system set forth in claim 5 wherein each said beam is formed by a combination of separate laser beams of different colors and wherein said information signals are color dependent.

10. The system set forth in claim 5 wherein each individually modulated light beam is modulated by a separate optical body having electric field applying means associated therewith for control of light transmission therethrough and wherein said information signals are employed to energize and de-energize the field applying means in accordance with the information.

11. In a system for producing an image comprised of a plurality of coordinate positions, the combination of:

rotating digital storage means having a predetermined storage address for each of the coordinate positions of the image, means for reproducing the data stored at each storage address of the storage means as the storage means is rotated, means for producing a light beam modulated in accordance with the reproduced data as the storage means is rotated, rotating scanning means fixed to the storage means for scanning the light beam onto the corresponding coordinate points of the image, and digital processing means for receiving image update information and updating the data stored at each storage address to change the image in accordance with the image update information.

12. The system defined in claim 11 wherein the means for producing the modulated light beam comprises a laser and an acoustic light modulator.

13. The system defined in claim 12 wherein the acoustic modulator comprises a light modulating medium, means for inducing ultrasonic stress waves in the medium in response to an electrical signal, and means for modulating the electrical signal to provide a plurality of frequencies, the amplitude of each frequency being individually modulated in accordance with different data reproduced from the storage means.

References Cited

UNITED STATES PATENTS

| | | | |
|---|---|---|---|
| 3,055,258 | 9/1962 | Hurvitz | 250—199 |
| 3,383,460 | 5/1968 | Pritchard | 178—5.4 |
| 1,867,542 | 7/1932 | Hammond | 178—6 |
| 1,752,876 | 4/1930 | Alexanderson | 178—6 |

ROBERT L. GRIFFIN, Primary Examiner

J. A. ORSINO, Jr., Assistant Examiner

U.S. Cl. X.R.

178—5.4, 6.6, 7.6; 250—199; 350—161